US011938812B2

(12) United States Patent
Fliearman et al.

(10) Patent No.: US 11,938,812 B2
(45) Date of Patent: Mar. 26, 2024

(54) TANDEM WHEEL ASSEMBLY AND TANDEM WHEEL KIT

(71) Applicant: Deere & Company, Moline, IL (US)

(72) Inventors: Steven R. Fliearman, Coffeyville, KS (US); Jackson Baca, Owasso, OK (US); Prashant Shinde, Pune (IN)

(73) Assignee: DEERE & COMPANY, Moline, IL (US)

( * ) Notice: Subject to any disclaimer, the term of this patent is extended or adjusted under 35 U.S.C. 154(b) by 1001 days.

(21) Appl. No.: 16/852,117

(22) Filed: Apr. 17, 2020

(65) Prior Publication Data

US 2021/0323616 A1    Oct. 21, 2021

(51) Int. Cl.
| | |
|---|---|
| B60K 17/36 | (2006.01) |
| B60B 11/02 | (2006.01) |
| B60B 37/10 | (2006.01) |
| B60G 21/02 | (2006.01) |
| E02F 9/02 | (2006.01) |

(Continued)

(52) U.S. Cl.
CPC .............. *B60K 17/36* (2013.01); *B60B 11/02* (2013.01); *B60B 37/10* (2013.01); *B60G 21/02* (2013.01); *E02F 9/02* (2013.01); *B60G 2206/011* (2013.01); *B62D 53/045* (2013.01); *B62D 53/064* (2013.01)

(58) Field of Classification Search
CPC ... B60B 37/10; B60G 21/02; B60G 2206/011; B60G 2206/911; B60K 17/36; B60K 17/342; E02F 9/02
See application file for complete search history.

(56) References Cited

U.S. PATENT DOCUMENTS

| | | | |
|---|---|---|---|
| 2,374,196 | A | 2/1942 | Harbers |
| 2,819,910 | A | 1/1958 | Walter |

(Continued)

FOREIGN PATENT DOCUMENTS

| | | |
|---|---|---|
| CN | 201192987 Y | 2/2009 |
| CN | 110217103 A | 9/2019 |

(Continued)

OTHER PUBLICATIONS

USPTO Non-Final Office Action issued in utility U.S. Appl. No. 17/068,159 dated Oct. 7, 2022.

(Continued)

*Primary Examiner* — Frank B Vanaman
(74) *Attorney, Agent, or Firm* — KLINTWORTH & ROZENBLAT IP LLP

(57) ABSTRACT

A tandem wheel assembly or kit has a housing that includes a central chain box, a first wheel end casing, and a second wheel end casing. The central chain box has an internal volume extending between a first box end and a second box end, a unitary pivot portion having a box opening disposed about a pivot axis, a first box flange with a first box flange face and a second box flange with a second box flange face. The first wheel end casing has a first wheel end flange with a first wheel end flange face mateable with the first box flange face, a first wheel end opening, and defines a first length. The second wheel end casing has a second wheel end flange with a second wheel end flange face mateable with the second box flange face, a second wheel end opening, and defines a second length.

20 Claims, 7 Drawing Sheets

(51) Int. Cl.
  *B62D 53/04*  (2006.01)
  *B62D 53/06*  (2006.01)

(56) References Cited

U.S. PATENT DOCUMENTS

| | | | |
|---|---|---|---|
| 3,166,142 A | 1/1965 | Frazier | |
| 3,198,551 A | 8/1965 | Garner | |
| 3,450,221 A | 6/1969 | Nelson | |
| 3,786,888 A | 1/1974 | Nelson | |
| 3,792,871 A | 2/1974 | Chalmers | |
| 3,976,154 A * | 8/1976 | Clark | B60K 17/046 180/24.09 |
| 4,064,956 A * | 12/1977 | Wildey | B60K 17/32 180/383 |
| 4,237,994 A | 12/1980 | McColl | |
| 4,278,141 A | 7/1981 | Oswald et al. | |
| 4,407,381 A | 10/1983 | Oswald et al. | |
| 4,535,860 A | 8/1985 | Waggoner | |
| 4,560,018 A * | 12/1985 | Satzler | B62D 55/12 180/9.1 |
| 4,646,880 A | 3/1987 | Logan | |
| 5,016,905 A | 5/1991 | Licari | |
| 5,337,849 A | 8/1994 | Eavenson, Sr. et al. | |
| 5,417,297 A | 5/1995 | Auer | |
| 6,036,611 A * | 3/2000 | Bigo | F16H 7/24 474/146 |
| 6,112,843 A * | 9/2000 | Wilcox | B60K 17/36 180/209 |
| 6,200,240 B1 | 3/2001 | Oates | |
| 6,416,136 B1 * | 7/2002 | Smith | B60B 35/003 301/124.1 |
| 7,124,853 B1 * | 10/2006 | Kole, Jr. | B62D 21/12 180/312 |
| 7,229,094 B2 | 6/2007 | Miller et al. | |
| 7,296,642 B1 | 11/2007 | DeWald | |
| 7,832,509 B2 | 11/2010 | Thomson et al. | |
| 7,954,574 B2 | 6/2011 | Schoon | |
| 8,262,125 B2 | 9/2012 | Sergison et al. | |
| 8,733,489 B2 | 5/2014 | Heine et al. | |
| 9,242,556 B2 | 1/2016 | Ziech et al. | |
| 9,358,880 B2 | 6/2016 | Bindl | |
| 9,868,322 B1 | 1/2018 | Varela | |
| 10,106,010 B2 | 10/2018 | Fliearman | |
| 10,107,363 B2 | 10/2018 | Fliearman et al. | |
| 10,207,580 B2 | 2/2019 | Long et al. | |
| 10,434,836 B2 | 10/2019 | Fliearman | |
| 11,376,956 B2 | 7/2022 | Fliearman et al. | |
| 2005/0045390 A1 | 3/2005 | Lamela et al. | |
| 2005/0279563 A1 | 12/2005 | Peterson | |
| 2006/0154776 A1 | 7/2006 | Claussen et al. | |
| 2008/0230284 A1 | 9/2008 | Schoon | |
| 2010/0012401 A1 | 1/2010 | Thomson et al. | |
| 2014/0145410 A1 * | 5/2014 | Kaufman | E02F 9/02 384/420 |
| 2015/0165898 A1 | 6/2015 | Bindl | |
| 2016/0178041 A1 | 6/2016 | Hagman | |
| 2016/0263987 A1 | 9/2016 | Brownell et al. | |
| 2017/0050517 A1 * | 2/2017 | Higuchi | B60K 17/342 |
| 2017/0080752 A1 | 3/2017 | Varela et al. | |
| 2018/0065439 A1 | 3/2018 | Fliearman | |
| 2018/0065440 A1 | 3/2018 | Fliearman | |
| 2018/0312060 A1 | 11/2018 | Varela | |
| 2019/0001772 A1 | 1/2019 | Dyna | |
| 2019/0331173 A1 | 10/2019 | Eschenburg et al. | |
| 2020/0400226 A1 | 12/2020 | Shinde et al. | |

FOREIGN PATENT DOCUMENTS

| | | |
|---|---|---|
| DE | 19681259 C2 | 6/2000 |
| DE | 19908958 A1 | 9/2000 |
| DE | 102021209187 A1 | 4/2022 |
| GB | 567097 A | 1/1945 |
| GB | 1576166 A | 10/1980 |
| WO | 2012123630 A1 | 9/2012 |
| WO | 2016170410 A1 | 10/2016 |

OTHER PUBLICATIONS

USPTO Non-Final Office Action issued in utility U.S. Appl. No. 17/186,516 dated Oct. 14, 2022.
German Search Report issued in application No. DE102021207440.5 dated Mar. 17, 2022 (17 pages).
European Extended Search Report for application No. 17184539 dated Jan. 10, 2018.
USPTO Ex Parte Quayle Action for U.S. Appl. No. 15/255,860 issued Apr. 5, 2018.
German Search Report issued in application No. DE102021203728.3 dated Feb. 14, 2022 (06 pages).
John Deere, 317 and 320 Skid Steers, Introduction and Customer Information, T198465A A.1, Manufactured 2004-2009.
John Deere, 317 and 320 Skid Steers PC9347 Parts List—50 Power Train, undated, admitted prior art.
John Deere, Drive Chains and Sprockets—ST119001, 317 and 320 Skid Steers PC9347—50 Power Train Parts List, undated, admitted prior art.
John Deere, Axle ST119002, 317 and 320 Skid Steers PC9347—50 Power Train Parts List, undated, admitted prior art.
John Deere, Image of Fixed Axle Drive, undated, admitted prior art.
Tigercat, H-Series Skidders, 620H | 630H | 632H | 625H | 635H Brochure © 2001-2020.
Tigercat Bogie Skidder Image, undated admitted prior art.
NAF Bogie Axles For Your Heavy Duty Playgrounds Brochure, 2019.
German Search Report issued in application No. DE102021209187.3 dated Mar. 29, 2022 (17 pages).
German Search Report issued in application No. DE102022202294.7 dated Oct. 13, 2022 with translation (21 pages).
USPTO Non-Final Office Action issued in utility U.S. Appl. No. 17/075,144 dated Oct. 18, 2021.
USPTO Non-Final Office Action issued in Utility U.S. Appl. No. 17/236,126 dated Mar. 31, 2023.
USPTO Final Office Action issued in Utility U.S. Appl. No. 17/068,159 dated Apr. 27, 2023.

* cited by examiner

TANDEM WHEEL ASSEMBLY AND TANDEM WHEEL KIT

CROSS-REFERENCE TO RELATED APPLICATION(S)

Not applicable.

STATEMENT OF FEDERALLY SPONSORED RESEARCH OR DEVELOPMENT

Not applicable.

FIELD OF THE DISCLOSURE

This disclosure generally relates to tandem wheel assemblies for work vehicles.

BACKGROUND OF THE DISCLOSURE

Work vehicles, such as used in the construction, agriculture, forestry, mining and other industries, may utilize tandem wheel assemblies (also known as bogie axles) to support significant loads across four or more ground-engaging or track wheels utilizing a single axle that allows the wheels pivot together to maintain ground contact over varying terrain without significantly shifting other areas of the work vehicle, including an operator cabin and a work implement (e.g., a blade). Such tandem wheel assemblies may also be driven (e.g., from the work vehicle powertrain through a transmission or may be powered themselves). One work vehicle that often utilizes a tandem wheel assembly is a motor grader. Applications may require the motor grader to deliver high-torque, low-speed power to the ground-engaging wheels or tracks, which is achieved through a high-ratio gear reduction to the wheels. Different applications may be suitable for different motor graders with different load-carrying capabilities. The various machines may have different overall dimensions and use different size wheels and tandem wheel assemblies of different sizes and wheelbases.

SUMMARY OF THE DISCLOSURE

The disclosure provides an improved tandem wheel assembly and tandem wheel kit for a work vehicle.

In one aspect, the disclosure provides a tandem wheel assembly for a work vehicle. The tandem wheel assembly has a housing that includes a central chain box, a first wheel end casing and a second wheel end casing. The central chain box has an inner wall and an outer wall defining an internal volume and extending between a first box end and a second box end, the inner wall defining as a unitary part of the central chain box a pivot portion having a box opening disposed about a pivot axis and communicating with the internal volume, the central chain box having at the first box end a first box flange with a first box flange face and having at the second box end a second box flange with a second box flange face. The first wheel end casing has a first wheel end flange with a first wheel end flange face mateable with the first box flange face, the first wheel end casing having a first wheel end opening disposed about a first wheel end axis substantially parallel to the pivot axis and in communication with the internal volume of the central chain box when the first wheel end casing is mounted to the first box end, the first wheel end casing defining a first length from the first wheel end flange face to the first wheel end axis. The second wheel end casing having a second wheel end flange with a second wheel end flange face mateable with the second box flange face, the second wheel end casing having a second wheel end opening in communication with the internal volume of the central chain box and disposed about a second wheel end axis substantially parallel to the pivot axis and in communication with the internal volume of the central chain box when the second wheel end casing is mounted to the second box end, the second wheel end casing defining a second length from the second wheel end flange face to the second wheel end axis.

In another aspect, the disclosure provides a tandem wheel kit for a work vehicle. The tandem wheel housing includes a central chain box, a first wheel end casing, a second wheel end casing, and a third wheel end casing. The central chain box has an inner wall and an outer wall defining an internal volume and extending between a first box end and a second box end, the inner wall defining as a unitary part of the central chain box a pivot portion having a box opening disposed about a pivot axis and communicating with the internal volume, the central chain box having at the first box end a first box flange with a first box flange face and having at the second box end a second box flange with a second box flange face. The first wheel end casing has a first wheel end flange with a first wheel end flange face mateable with the first box flange face, the first wheel end casing defining as a unitary part of the first wheel end casing a first wheel mount extending from an outer wall of the first wheel end casing and defining a first wheel end opening disposed about a first wheel end axis substantially parallel to the pivot axis and in communication with the internal volume of the central chain box when the first wheel end casing is mounted to the first box end, the first wheel end casing defining a first length from the first wheel end flange face to the first wheel end axis. The second wheel end casing has a second wheel end flange with a second wheel end flange face mateable with the second box flange face, the second wheel end casing defining as a unitary part of the second wheel end casing a second wheel mount extending from an outer wall of the second wheel end casing and defining a second wheel end opening in communication with the internal volume of the central chain box and disposed about a second wheel end axis substantially parallel to the pivot axis and in communication with the internal volume of the central chain box when the second wheel end casing is mounted to the second box end, the second wheel end casing defining a second length from the second wheel end flange face to the second wheel end axis. The third wheel end casing has a third wheel end flange with a third wheel end flange face mateable with the first box flange face, the third wheel end casing having a third wheel end opening in communication with the internal volume of the central chain box and disposed about a third wheel end axis substantially parallel to the pivot axis and in communication with the internal volume of the central chain box when the third wheel end casing is mounted to the first box end, the third wheel end casing defining a third length from the third wheel end flange face to the third wheel end axis, wherein the third length is different than the first length. A configurable tandem wheelbase is defined by selectively mounting to the first box end of the central chain box either the first wheel end casing or the third wheel end casing.

The details of one or more embodiments are set forth in the accompanying drawings and the description below.

Other features and advantages will become apparent from the description, the drawings, and the claims.

BRIEF DESCRIPTION OF THE DRAWINGS

Like reference symbols in the various drawings indicate like elements.

DETAILED DESCRIPTION

Figure 1:
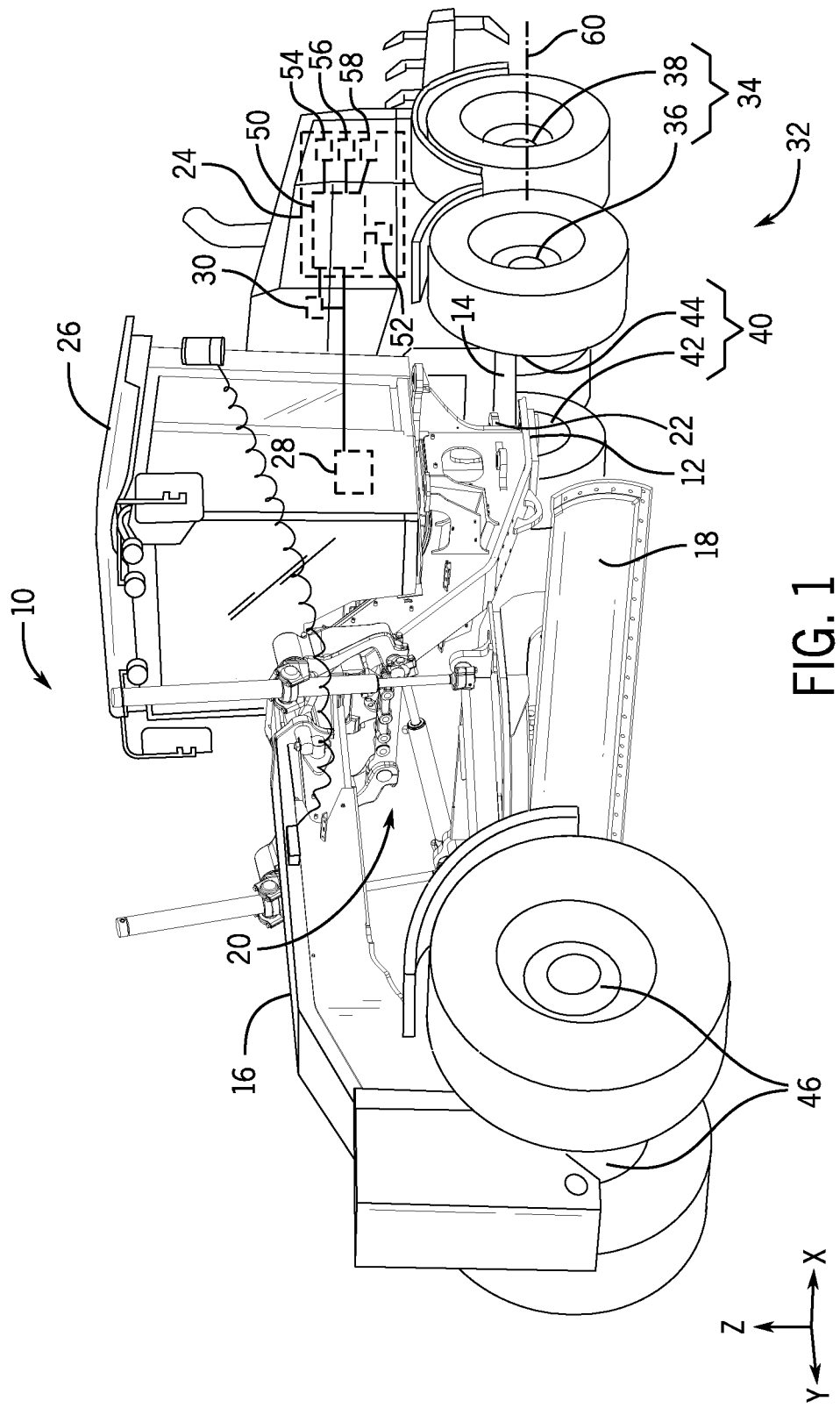
FIG. 1 is a simplified perspective view of an example work vehicle in the form of a motor grader in which a tandem wheel assembly may be used in accordance with this disclosure.

The following describes one or more example embodiments of the disclosed tandem wheel assembly, as shown in the accompanying figures of the drawings described briefly above. Various modifications to the example embodiments may be contemplated by one of skill in the art.

As used herein, unless otherwise limited or modified, lists with elements that are separated by conjunctive terms (e.g., "and") and that are also preceded by the phrase "one or more of" or "at least one of" indicate configurations or arrangements that potentially include individual elements of the list, or any combination thereof. For example, "at least one of A, B, and C" or "one or more of A, B, and C" indicates the possibilities of only A, only B, only C, or any combination of two or more of A, B, and C (e.g., A and B; B and C; A and C; or A, B, and C).

Furthermore, in detailing the disclosure, terms of direction and orientation, such as "longitudinal," "inner," "outer," "radial," "axial," "circumferential," "lateral," and "transverse" may be used. Such terms are defined, at least in part, with respect to a wheel axle, pivot axis, and/or a work vehicle. As used herein, the term "longitudinal" indicates an orientation along the length of the apparatus; the term "lateral" indicates an orientation along a width of the apparatus and orthogonal to the longitudinal orientation; and the term "transverse" indicates an orientation along the height of the apparatus and orthogonal to the longitudinal and lateral orientations. These orientations may be taken in relation to a work vehicle, or a travel direction of the work vehicle, to which the components may be attached. In other examples, the components referenced by those terms may be reversed in accordance with the present disclosure.

Overview

Work vehicles, such as motor graders, typically include components such as a chassis, power train (e.g., engine and drivetrain), suspension, and work implements (e.g., blades) that implement tasks over a variety of terrain and conditions. Typically, the work vehicle may perform tasks that require consistent work implement positioning (e.g., blade scraping a work area at a desired height to produce a flat surface). The wheel axle region may support significant static weight loads from on-board components (e.g., engine, transmission, axle, work implements, etc.) and encounter significant operating loads (e.g., via attached work implements and shocks/loads through the wheels and suspension). Therefore, the work vehicle must accommodate varying terrain, static loads, and operating loads resulting from the work tasks while maintaining the desired implement positioning. A tandem wheel assembly may accommodate such loads or changes in grade by mounting wheel assemblies, typically rear wheel assemblies, together to pivot relative to the work vehicle, providing ground contact for the wheel without significantly hindering work implement placement.

In the case of a motor grader especially, the work implement is a large blade, which, during initial stages of site preparation, cuts and moves large quantities of ground. During final stages, the final base surface must be flat and precisely sloped over a large area and/or distance (e.g., several miles of roadway) even after rear wheels follow behind the blade. The motor grader must travel at sufficient speed to be productive while preventing unwanted bouncing and rocking; for example, a motor grader may work at a speed range from "crawling" slowly at about 0.3 miles per hour (mph) to about 7 mph. In other applications (e.g., rough preliminary cuts or snow plowing) may work at a higher speed range up to about 40 mph. During use, the blade experiences resistive forces such as friction from the ground, weight of previously-loosened soil and debris material while it flows along the blade, and shock loads from obstacles. With a blade size that may range from 8-24 feet long and 1-3 feet tall, for example, the weight of ground or other material carried by the blade is significant. These operating loads are transferred to the vehicle wheels, which transfer the load to the surface being prepared. Accordingly, the wheels can contribute to site preparation performance by maintaining ground contact for consistent traction while also evenly distributing loads on the ground surface to minimize pressure on the scraped work surface.

Additionally, this disclosure provides a tandem wheel that may have modular wheel ends accommodating different wheelbase requirements of the machine. Work vehicle manufacturers may offer a line of a vehicle platform in different models or classes with multiple similar work vehicles varying in certain respects, such as chassis size, engine size, or various other features. For example, motor graders may be provided as different models with different blade sizes and different expected operating loads, which may require different wheel sizes, engine sizes, wheelbases, and the like. In some examples, related models may have tandem wheelbases that vary by about 60-160 mm (e.g., wheelbases of 1480 mm, 1540 mm, and 1640 mm). However, these different models also have many shared characteristics and components (e.g., drive train components, engine size, etc.). The tandem wheel assemblies for different models of work vehicles may have variations (e.g., tandem wheel housing dimensions, chain size, sprocket size, wheel diameter) that require significant redesign and separate components across the platform line. Such tandem wheel assemblies may have complicated multi-part housings with several major components resized for each different model size. This disclosure provides modularity in wheel end casings of different lengths while sharing other parts (such as a central chain box and drive components). This disclosure also may accommodate modularity in some drive components (e.g., one or more sprockets and/or chains) that are readily assembled with the shared parts. The disclosed tandem wheel assembly thus may provide relatively fewer parts and lighter weight compared to conventional arrangements.

This disclosure also provides a tandem wheel kit with multiple wheel end casings that may selectively be mounted to a central chain box. The wheel end casings have different lengths; as such, multiple wheelbases are achievable with a single central chain box and at least some shared internal components. The selected wheel end casings that are mounted to each end of the central chain box may have substantially equal lengths. The tandem wheel kit may thus be assembled to provide the wheelbase of a particular work vehicle model.

The disclosure provides a tandem wheel assembly that is advantageous for manufacturing, assembly, and repair. Many components assembled in tandem wheel assemblies are large formed metal parts, castings and/or specialized parts that have may high material and production costs. The aforementioned shared components that integrate with modular components reduce costs because separate processes and assembly lines are reduce or eliminated. For example, a single central chain box may be designed and manufactured to serve multiple tandem wheel sizes. A variety of access panels and grip surfaces allow for maintenance and repairs to be performed without obstruction from the wheels, power train, or other components. This accessibility simplifies assembly and, for repairs, saves costs and reduces time that a work vehicle is out of commission.

Moreover, this disclosure provides a pivot joint for a tandem wheel assembly for a work vehicle that with a portion of the pivot joint integrated as a unitary part of the housing. The unitary arrangement reduces the number of parts of the housing, saving manufacturing costs. The pivot joint is the structural link between the work vehicle and the tandem wheel assembly; as such, the various static and dynamic loads supported by the tandem wheels are transferred through the pivot joint. Additionally, the disclosed tandem wheels are driven via a power train of the work vehicle, which can induce torque loads in surrounding hosing structures. Accordingly, the pivot joint must be suitably strong to support the various loads along with induced torque while providing the requisite pivoting motion to maintain ground contact. The unitary pivot portion is formed together with the central chain box from a heavy-duty material (e.g., cast metal) to accommodate these loads and perform these functions.

The following describes one or more example implementations of the disclosed tandem wheel and housing. While discussion herein may sometimes focus on the example application of a tandem wheel with a cast housing in a motor grader, the disclosed tandem wheel may also be applicable to bogie axles or tandem axles in other types of work vehicles, including self-propelled or towed work vehicles, as well as various other agricultural machines (e.g., articulated tractors, utility tractors, front end loaders, harvesters and the like), various construction and forestry machines (e.g., forwarders, skidders and so on), and transportation vehicles (e.g., semi trailers).

Example Embodiments of the Tandem Wheel Assembly

Referring to FIG. 1, in some embodiments, the disclosed work vehicle 10 may be a motor grader, although, as noted, the tandem wheel described herein may be applicable to a variety of machines, such as other construction vehicles, agricultural vehicles including articulated-frame tractors, forestry vehicles (e.g., forwarder), and transportation vehicles such as semi-trailers. As shown, the work vehicle 10 may be considered to include a chassis 12 constituted by a rear frame 14 and a front frame 16 for carrying a blade 18 that is selectively positioned by an implement drive system 20. The work vehicle 10 may further be considered to include a power train 24, an operator cabin 26, a control system 28, and a hydraulic system 30. The work vehicle 10 may be supported off the ground by ground-engaging wheels or tracks. In the illustrated example, the work vehicle 10 includes a tandem wheel assembly 32 on the rear frame 14 mounting four wheels including a pair of left wheels 34 defined by a first left wheel 36 and a second left wheel 38, and a pair of right wheels 40 defined by a first right wheel 42 and a second right wheel 44 (also collectively referred to as "the four tandem wheels 36, 38, 42, 44"). A front axle (not shown) on the front frame 16 mounts a third set of wheels 46 that may be configured to be steerable automatically or by operator control. It should be noted that any left/right wheel pairs (first left wheel 36 with the first right wheel 42, the second left wheel 38 with the second right wheel 44, or the third set of wheels 46) may be arranged as dual wheels on each left/right lateral side of the work vehicle 10 (e.g., sides in the x-direction illustrated in FIG. 1).

Generally, the power train 24 includes a source of propulsion, such as an engine 50, which supplies power to the work vehicle 10, as either direct mechanical power or after being converted to electric power (e.g., via batteries) or hydraulic power. In one example, the engine 50 is an internal combustion engine, such as a diesel engine, that is controlled by an engine control module (not shown) of the control system 28. It should be noted that the use of an internal combustion engine is merely an example, as the source of propulsion may be a fuel cell, an electric motor, a hybrid-gas electric motor, or other power-producing devices. A transmission 52 transmits power from the engine 50 to one or more of the wheels, for example the four tandem wheels 36, 38, 42, 44 of the tandem wheel assembly 32. Additionally, the power train 24 has wheel steering components 54, including various devices (e.g., power steering pumps and lines, steering mechanisms, and the like) that couple manual (e.g., operator steering controls or wheel) and/or automated (via the control system 28) steering input to one or more of the sets of wheels, such as the third set of wheels 46. The power train 24 may additionally or alternatively include various devices (e.g., steering mechanisms, hydraulic actuators, and the like) that couple manual and/or automated steering input to the articulated joint 22.

In addition to providing tractive power to propel the work vehicle 10, the engine 50 may provide power to various onboard subsystems, including various electrical and hydraulic components of the work vehicle, and for off-boarding power to other sub-systems remote from the work vehicle 10. For example, the engine 50 may provide mechanical power that is converted to an electric format to run the electronics of the control system 28 and one or more electric drives of the work vehicle 10. The power train 24 thus may have mechanical to electrical power conversion components 56, one or more batteries 58, and associated electronics, including various alternators, generators, voltage regulators, rectifiers, inverters, and the like. The engine 50 may also provide mechanical power that is converted to hydraulic format to power various pumps and compressors that pressurize fluid to drive various actuators of the hydraulic system 30 in order to power wheel steering and braking and various work implements onboard the work vehicle 10. The hydraulic system 30 may include other components (e.g., valves, flow lines, pistons/cylinders, seals/gaskets, and so on), such that control of various devices may be effected with, and based upon, hydraulic, mechanical, or other signals and movements.

The control system 28 may be configured as a computing device with associated processor devices and memory architectures, as a hard-wired computing circuit (or circuits), as a programmable circuit, as a hydraulic, electrical, or electro-hydraulic controller. The control system 28 may be configured to execute various computational and control functionality with respect to the work vehicle 10, including various devices associated with the power train 24, the hydraulic system 30, the implement drive system 20, and various additional components of the work vehicle 10. In some embodiments, the control system 28 may be configured to receive input signals in various formats (e.g., as hydraulic signals, voltage signals, current signals, and so on), and to output command signals in various formats (e.g., as hydraulic signals, voltage signals, current signals, mechanical movements, and so on).

As noted above, the hydraulic system 30 may be controlled by the control system 28 (automatically, via operator input, or both). The hydraulic system 30 may be powered by the engine 50 and configured in various arrangements to serve a plurality of hydraulic functions (e.g., powering the implement drive system 20). Accordingly, the hydraulic system 30 may have components (not shown) including a pump for supplying pressurized hydraulic fluid, a reservoir for storing hydraulic fluid, and various valves (e.g., a control valve) associated with each function.

In the illustrated example, when the work vehicle 10 drives in the forward direction (indicated in FIG. 1), the tandem wheel assembly 32 follows behind the blade 18 and supports most weight on the rear frame 14. The tandem wheel assembly 32 is pivotable about a pivot axis 60. In particular, each of the pair of left wheels 34 and the pair of right wheels 40 can independently pivot relative to the work vehicle 10 about the pivot axis 60. During use, if the work vehicle 10 encounters an obstacle or an uneven surface, the tandem wheel assembly 32 accommodates this by pivoting. As a result, the transfer of bumps or terrain changes is mitigated or eliminated, maintaining the blade 18 and the cabin 26 in a relatively stable position that maintains traction and weight distribution. Likewise, the four tandem wheels 36, 38, 42, 44 maintain ground contact while pivoting.

Figure 2:
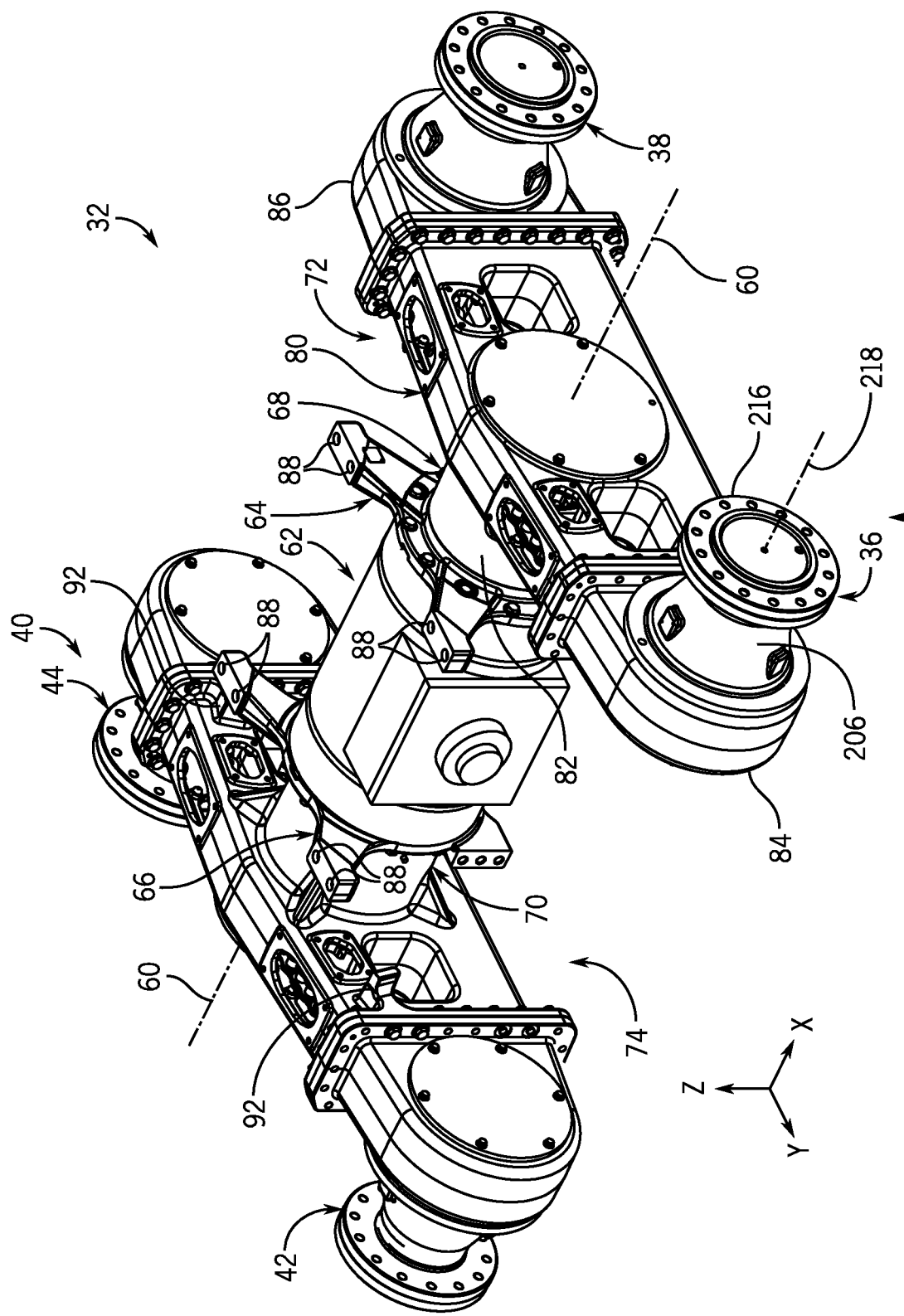
FIG. 2 is an isometric view of an example tandem wheel assembly for the example motor grader of FIG. 1.
Figure 3:
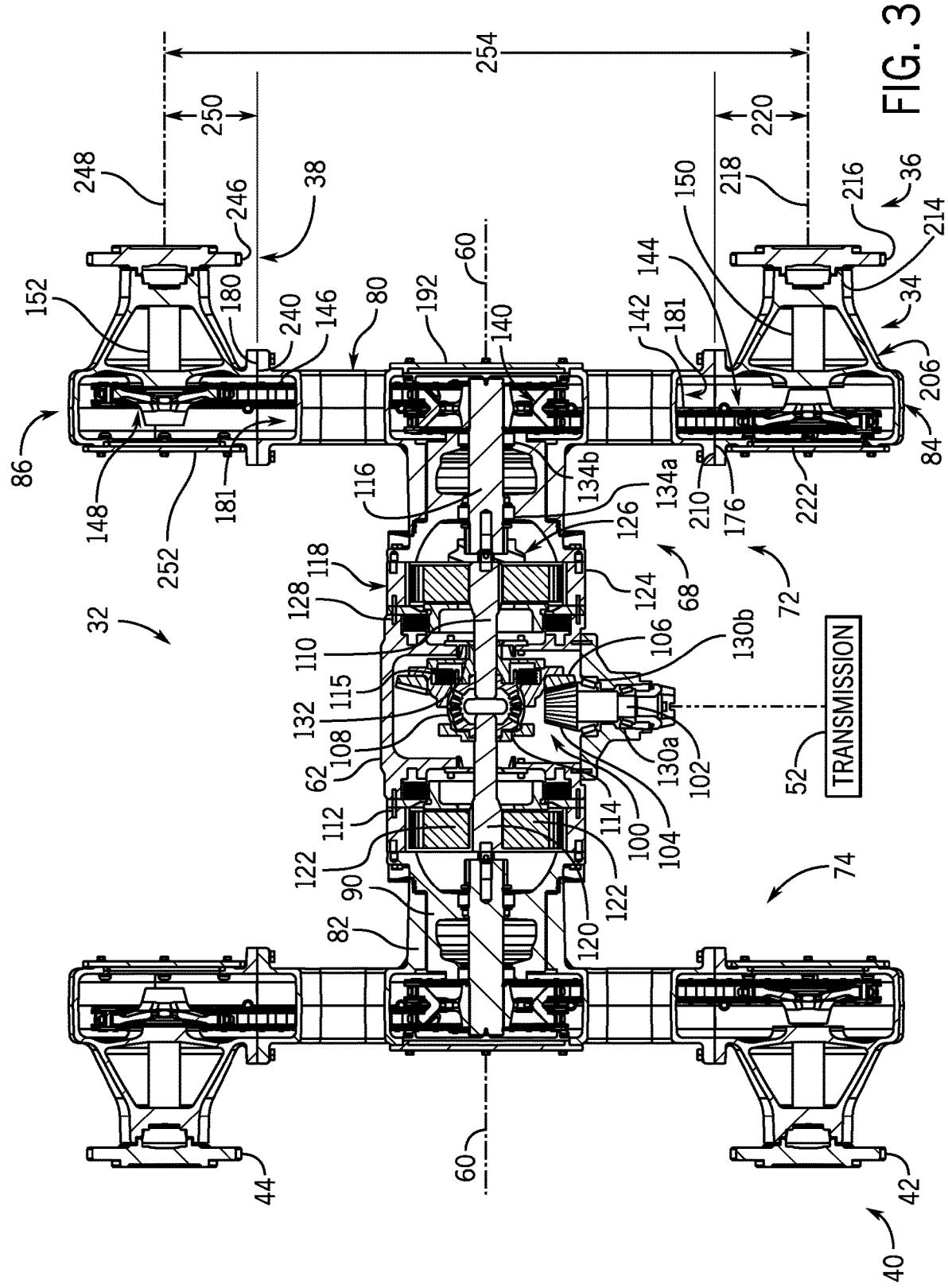
FIG. 3 is a top cross-sectional view of the tandem wheel assembly of FIG. 2 taken along plane 3-3 thereof.

Referring also to FIGS. 2 and 3, the tandem wheel assembly 32 mounts the four tandem wheels 36, 38, 42, 44 below the rear frame 14. The example tandem wheel assembly 32 may include a differential housing 62, first mounting arms 64, second mounting arms 66, a first pivot joint 68, a second pivot joint 70, a first tandem wheel housing 72, and a second tandem wheel housing 74. The first tandem wheel housing 72 includes a central chain box 80 with a pivot portion 82 extending laterally inwardly toward the differential housing 62, a first wheel end casing 84 for mounting the first left wheel 36, and a second wheel end casing 86 for mounting the second left wheel 38. It will be appreciated that central chain box 80 with separable first and second wheel end casings 84, 86 provides a robust and elegant design that advantageously accommodates modular attachment of different wheel end casings and internal drive components, as detailed below. The tandem wheel assembly 32 may have substantially similar mirrored structures on each lateral side of the differential housing 62 (for example, the first and second pivot joints 68, 70 in the illustrated example are substantially similar as are the first and second tandem wheel housings 72, 74). As such, details discussed below for one structure (e.g., the first pivot joint 68 or the first tandem wheel housing 72) are applicable to the corresponding opposite side structure.

The tandem wheel assembly 32 also functions to allow pivoting of the four tandem wheels 36, 38, 42, 44 relative to the work vehicle 10 about the pivot axis 60. The differential housing 62 is rigidly affixed to the first and second mounting arms 64, 66, which are fixed to the chassis 12 of the work vehicle 10 (e.g., via bolts through arm bores 88). Thus, the differential housing 62 is relatively fixed in place and one or both of the first and second tandem wheel housings 72, 74 pivot independently relative to the differential housing 62 via the first and second pivot joints 68, 70. In particular, the pivot portion 82 of the central chain box 80 is rotatably journaled on a fixed pivot portion 90 that is non-rotationally mounted relative to the differential housing 62 (and thus fixed relative to the chassis 12 of the work vehicle 10). One or more rotation limiters 92 may be provided on the central chain box 80 to delimit the maximum pivoting travel of the first and second tandem wheel housings 72, 74 (e.g., by contacting a lower portion of the chassis 12).

As also noted above, the tandem wheel assembly 32 includes components of the power train 24 to transmit motive power to each of the four tandem wheels 36, 38, 42, 44. A differential 100 is mounted in the differential housing 62 and connected to a driveshaft 102 that is driven by the transmission 52. The differential 100 includes gearing components to split and translate rotation of the driveshaft 102 laterally outboard toward the first and second tandem wheel housings 72, 74. A pinion gear 104 at the end of the driveshaft 102 meshes with a differential ring gear 106 mounted with a differential case 108 that is coupled to a first inboard shaft 110 and a second inboard shaft 112 (via a side gear 114). The differential 100 may be a limited-slip differential with a clutch pack 115 for resisting slip. The first inboard shaft 110 is coupled to a first outboard shaft 116 after gear reduction provided by a planetary gear set 118. In particular, the planetary gear set 118 includes a sun gear 120 formed on (or mounted on) the first inboard shaft 112, a plurality of planet gears 122 within a fixed ring gear 124, and a carrier 126 rotating with the plurality of planet gears 122. The carrier 126 is non-rotationally affixed to the first outboard shaft 116 which extends into the first tandem wheel housing 72. The planetary gear set 118 is selectively activated by a clutch pack 128.

The components of the power train 24 in the tandem wheel assembly 32 may include additional support components such as bearings for any rotating components. For example, the driveshaft 102 is supported in the differential housing 62 by first and second bearings 130a, 130b, which may be tapered roller bearings mounted in opposing tapered directions to accommodate axial loads in addition to rotation. The first inboard shaft 110 may be supported by one or more rotational bearings, as illustrated a tapered roller bearing 132 supports the first inboard shaft 110 between the differential 100 and the planetary gear set 118. The outboard shaft 116 may be supported in the fixed pivot portion 90 by first and second bearings 134a, 134b, which also may be opposing tapered roller bearings. It will be appreciated that the fixed pivot portion 90 is fixed relative to the work vehicle 10 while supporting the pivot portion 82 for journaled rotation at an exterior of the fixed pivot portion 90 and also supporting the outboard shaft 116 for power transmission rotation. Although not illustrated in detail, the differential housing 62 may house additional components of the differential 100, including brakes, u-joint(s), ring gear, pinion shaft(s), pinion gear(s), planet gear(s), side gears, clutch plates, bearings, and the like. Any type of differential may be implemented within the tandem wheel assembly 32, including an open differential, limited slip differential, or the like. The differential housing 62 also mounts portions of the driveshaft 102 (FIG. 3) and portions of the first and second inboard shafts 110, 112.

Power transmission continues inside the first tandem wheel housing 72 with a center sprocket 140 that is non-rotationally affixed to the first outboard shaft 116. The center sprocket 140 is a dual-ring sprocket that mounts a first chain 142 extending to a first wheel end sprocket 144 and also mounts a second chain 146 extending to a second wheel end sprocket 148. The first and second chains 142, 146 may be leaf chains, roller chains, or other suitable drive chains for heavy construction applications. The first wheel end sprocket 144 and the second wheel end sprocket 148 are each aligned with one of the dual rings of the center sprocket 140. Accordingly, when the center sprocket 140 rotates, the first and second chains 142, 146 provide co-rotation of the first and second wheel end sprockets 144, 148. The first wheel end sprocket 144 mounts a first wheel shaft 150 that supports the first left wheel 36. Likewise, the second wheel end sprocket 148 mounts a second wheel shaft 152 that supports the left rear wheel 38. The first and second wheel end sprockets 144, 148 will have an equal size (e.g., equal number of teeth) to drive the corresponding first and second left wheels 36, 38 at a substantially equal speed. Although the first chain 142 is illustrated as mounted inboard relative to the second chain 146, these relative positions may be reversed.

To propel the work vehicle 10, the engine 50 provides power to the transmission 52 that drives the differential 100, first inboard shaft 110, and first outboard shaft 116 which, in turn, drives the center sprocket 140 in the central chain box 80. The center sprocket 140 drives the first and second chains 142, 146, which respectively rotate the first and second wheel end sprockets 144, 148 and likewise the first and second wheel shafts 150, 152 to ultimately turn the pair of left wheels 34. The transmission 52 generally includes one or more gear arrangements and/or clutches (not shown) to modify the speed of the input from the engine 50 into one or more speeds suitable for the tandem wheel assembly 32. Further gear reduction may be achieved via the planetary gear set 118 between the first inboard shaft 110 and the first outboard shaft 116. If needed, gear reduction via a planetary gear set (not shown) or the like may be provided between the first wheel end sprocket 144 and the first left wheel 36 and likewise between the second wheel end sprocket 148 and the second left wheel 38.

Figure 4:
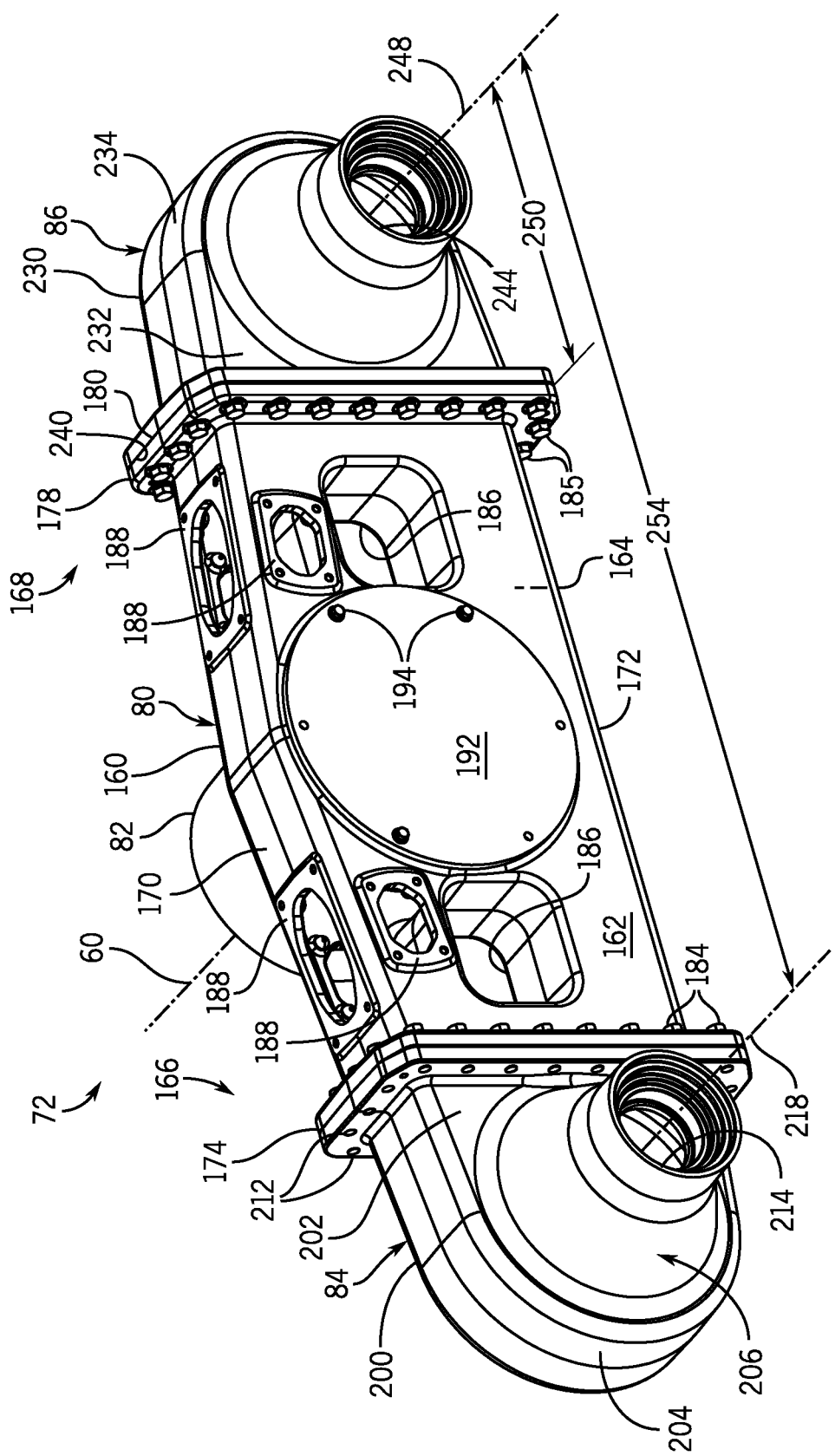
FIG. 4 is an isometric view of an outer view of one side of the example tandem wheel assembly of FIG. 2.
Figure 5:
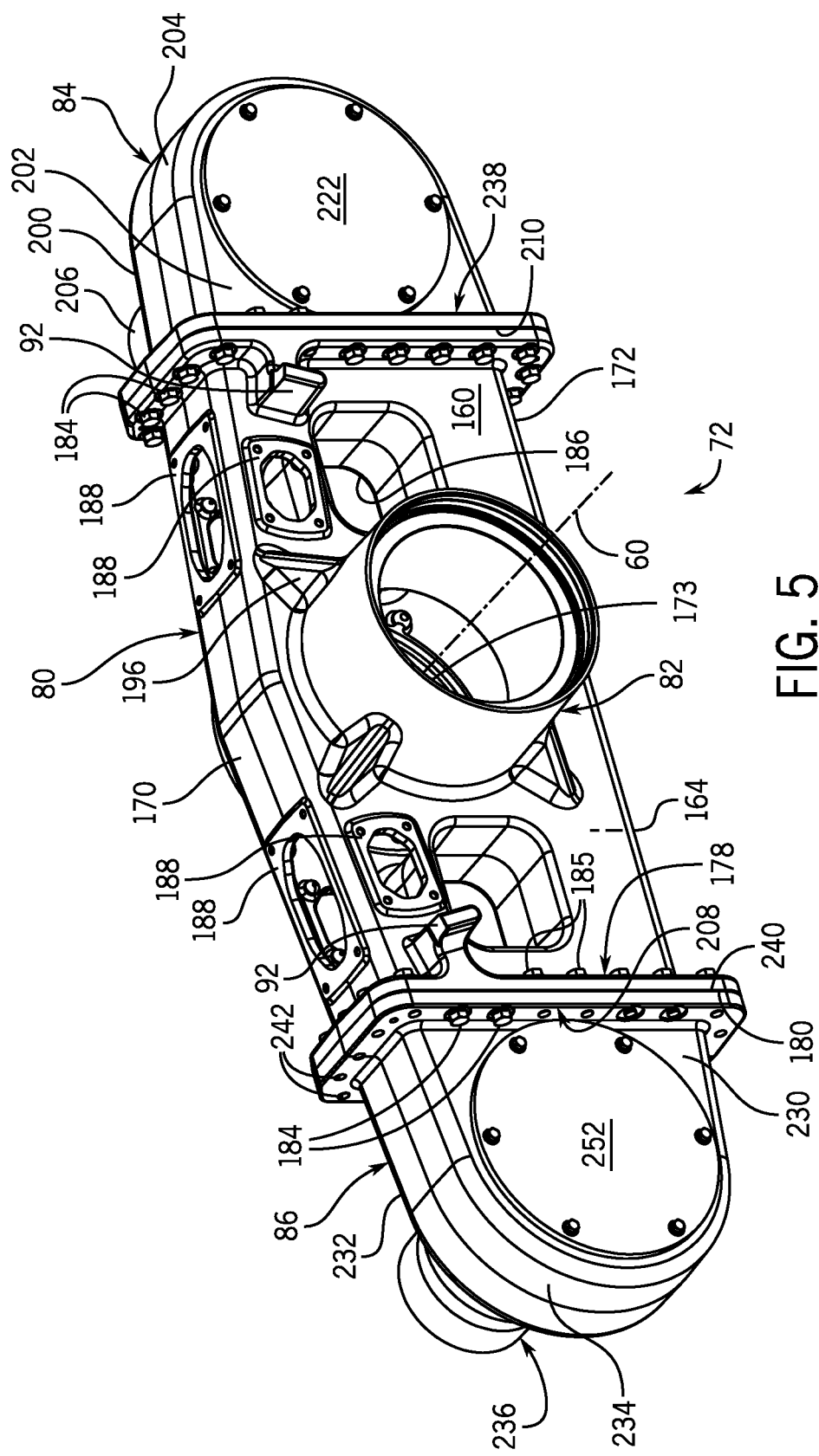
FIG. 5 is an isometric view of an inner side thereof.
Figure 6:
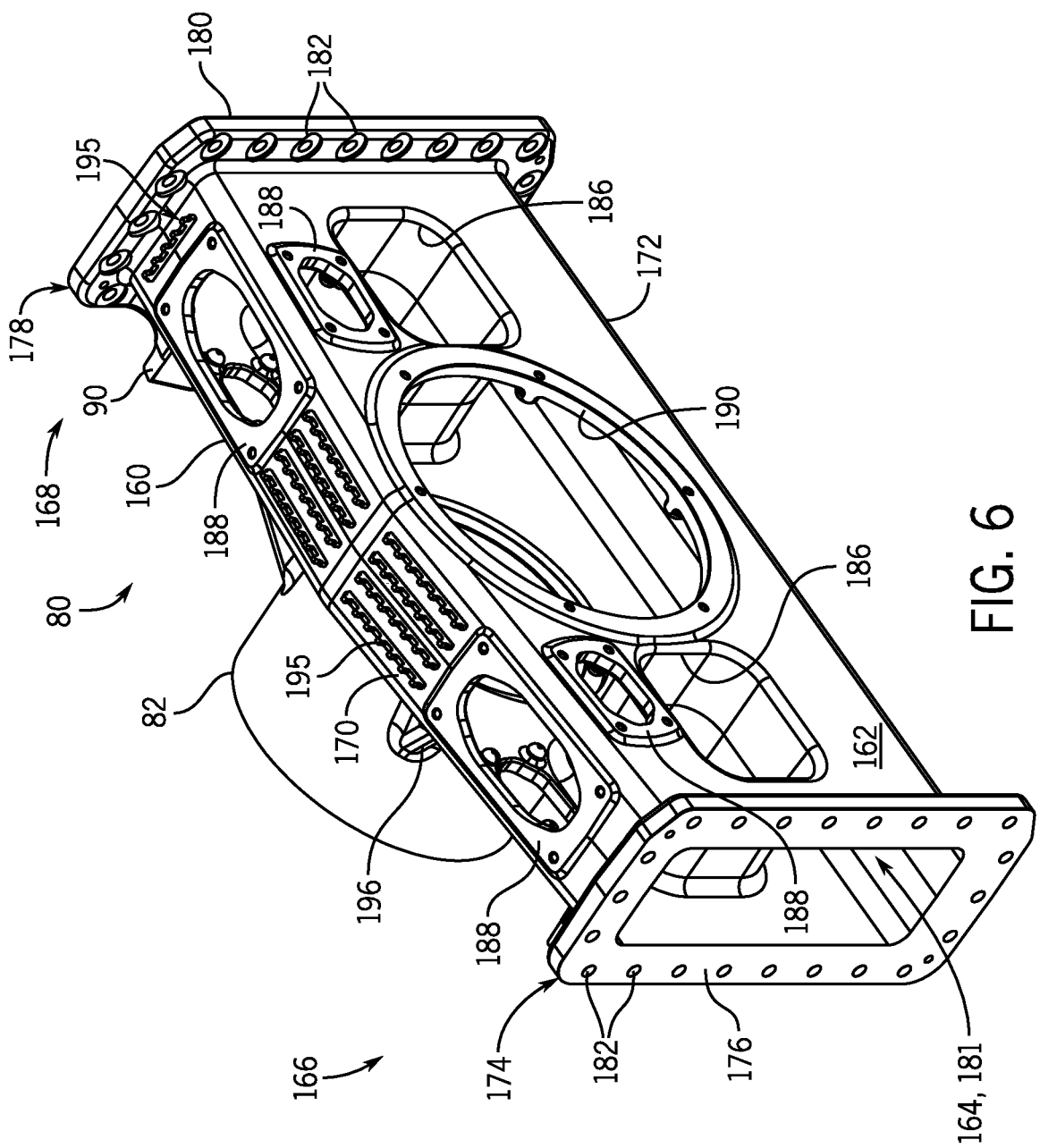
FIG. 6 is an isometric view of a central chain box of the tandem wheel assembly of FIG. 2.

Referring also now to FIGS. 4-6, the central chain box 80 may be a generally hollow part that has an inner wall 160 and an outer wall 162 defining an internal volume 164 that extends from a first box end 166 to a second box end 168 and extends between an upper wall 170 and a bottom wall 172. The central chain box 80 may be formed of cast metal or other suitably strong material. The inner wall 160 has the pivot portion 82 as a unitary part of the central chain box 80 (e.g., integrally formed of the same material by the same process at the same time), although in other examples the pivot portion 82 may be a separate piece. The unitary construction of the pivot portion 82 with the central chain box 80 may advantageously reduce parts and assembly time, thereby reducing manufacturing costs, and also provides suitable strength and rigidity to accommodate internal and external loads on the tandem wheel housing 72. The pivot portion 82 defines a box opening 173 disposed about the pivot axis 60 and communicating with the internal volume 164. A first box flange 174 having a first box flange face 176 is formed at the first box end 166 for mounting the first wheel end casing 84. A second box flange 178 having a second box flange face 180 is formed at the second box end 168 for mounting the second wheel end casing 86. The internal volume 164 houses the components of the power train 24 mentioned above, provides an elongated channel 181 for the first chain 142 and the second chain 146 extending from the first box end 166 to the second box end 168, and the internal volume 164 is at least partially filled with lubricant for the housed components. The first and second box flanges 174, 178 each include mounting bores 182 about the perimeter for respectively attaching the first and second wheel end casings 84, 86 via fasteners such as a first set of bolts 184 and a second set of bolts 185. The first and second box ends 166, 168 are substantially open within the first and second box flanges 174, 178 to extend the internal volume 164 to the first and second wheel end casings 84, 86.

One or more displacement areas 186 may be provided in the inner wall 160 and/or the outer wall 162 to reduce the volume of the internal volume 164 and reduce the amount of lubricant needed within the first tandem wheel housing 72. As illustrated, the displacement areas 186 are openings extending across the entire width of the central chain box 80. Alternatively, the displacement areas 186 may be internal dry cavities, depressions formed in the inner wall 160 and/or the outer wall 162, or the like. One or access windows 188 may be provided in the inner wall 160, the outer wall 162, the upper wall 170, or the bottom wall 172 for mounting a removable panel (not shown, via fasteners such as bolts) to allow access to the internal volume 164, for example for chain maintenance or lubrication. In the illustrated example, six of the access windows 188 are provided, two in each of the inner wall 160, the outer wall 162, and the upper wall 170. A central opening 190 (FIG. 6) may be formed in the outer wall 162 proximate the mounting location for the center sprocket 140, to mount a central access panel 192 (FIG. 4) that may be mounted by fasteners such as bolts 194. The central opening 190 allows for access in assembly or repair of the center sprocket 140 and components attached thereto. Additionally, one or more portions of the upper wall 170 may provide a grip surface 195 of treads or ridges formed as a unitary part of the upper wall 170 or as a separate piece attached to the upper wall 170, to prevent slipping if a user steps on the first tandem wheel housing 72 to access another area of the work vehicle 10. The pivot portion 82 may be supported by one or more reinforcement ribs 196, which may be formed as a unitary part of the central chain box 80. It is to be understood that the central chain box 80 may include various additional ribs or trusses in extending across the internal volume 164 to provide additional structural integrity and/or volume displacement without obstructing the first and second chains 142, 146. Additionally, although the mounting bores 182 are illustrated in an evenly spaced single row about the entire perimeter of the first and second box flanges 174, 178, various other arrangements are contemplated, including placement of mounting bores multiple rows or about only a portion of the perimeter.

The first wheel end casing is generally hollow with an inner wall 200, an outer wall 202, a perimeter wall 204, and a first wheel mount 206, which may be formed as a unitary part of the first wheel end casing 84 (e.g., integrally formed of the same material by the same process at the same time). The first wheel end casing 84 may be formed of the same material as the central chain box 80, for example a cast metal. The perimeter wall 204 may taper in height from top and bottom sides and forms a semicircular shape that is coaxial with the first wheel mount 206. A first wheel end flange 208 has a first wheel end flange face 210 includes mounting bores 212 in a corresponding arrangement with the mounting bores 182 of the first box flange 174 such that the first wheel end flange face 210 is mateable with the first box flange face 176 via the first set of bolts 184. The first wheel mount 206 extends laterally outboard from the outer wall 202 and terminates at a first wheel end opening 214 that supports at least a portion of a first wheel hub 216 (FIGS. 2 and 3) of the first left wheel 36. When assembled, the first wheel end opening 214 is in communication with the internal volume 164 of the central chain box 80. The first wheel shaft 1-52150 is mounted proximally to the first wheel end sprocket 144 for co-rotation and extends through the wheel mount 206. The first wheel shaft 150 extends toward the first wheel end opening 214 for mounting the first wheel hub 216 for co-rotation. The first wheel shaft 150 and the wheel hub 216 are supported in the first wheel mount 206 by rotational bearings (not shown). The first wheel end opening 214 thus defines a first wheel end axis 218 that is a rotation axis of the first left wheel 36, the first wheel end sprocket 144, the first wheel shaft 150, and the first wheel hub 216. This first wheel end axis 218 is substantially parallel to the pivot axis 60 and substantially perpendicular to the first set of bolts 184. The first wheel end casing 84 and the first wheel mount 206 may mount various additional supporting components (not shown) such as roller bearings, and as noted above, may mount gear components (not shown, such as a planetary gear set) for providing additional gear reduction between the first wheel end sprocket 144 and the first wheel hub 216. As discussed below, the first wheel end casing 84 defines a first length 220 (FIG. 3) from the first wheel end flange face 210 to the first wheel end axis 218. A first access panel 222 may be provided in the inner wall 200 for allowing assembly/repair access the first wheel end sprocket 144 or other components internal to the first wheel end casing.

The first wheel end casing 84 and the second wheel end casing 86 are substantially similar structures that may be duplicates or mirrored arrangements. As shown in FIGS. 3-6, the first and second wheel end casings 84, 86 are duplicate structures having a same length and arranged for mounting with the first and second box flanges 174, 178 of the central chain box 80 that are symmetrical. Accordingly, the second wheel end casing 86 includes substantially similar structures that will not be described in detail. In particular, the second wheel end casing 86 includes an inner wall 230, an outer wall 232, a perimeter wall 234, a second wheel mount 236, a second wheel end flange 238, a second wheel end flange face 240 mateable with the second box flange face 180, mounting bores 242, a second wheel end opening 244 in communication with the internal volume 164 of the central chain box 80, a second wheel hub 246, a second wheel end axis 248, a second length 250, and a second access panel 252. As discussed below, in some examples the second length 250 may differ from the first length 220, although they are illustrated as being equal.

The arrangement of the first box flange 174 with the first wheel end flange 208 and the second box flange 178 with the second wheel end flange 238 advantageously provides a strong connection between the parts of the first tandem wheel housing 72 with the first and second sets of bolts 184, 185 being easily accessible for assembly. As illustrated, each of the first and second box flange faces 176, 180 and the first and second wheel end flange faces 210, 240 may be substantially flat and planar to provide consistent mating surfaces for strength and to enclose the internal volume 164. Other complementary mating surface shapes may also be used. The arrangement of mating flanges also allows for modular attachment of various sizes (lengths) of the first and/or second wheel end casings 84, 86 as discussed below with reference to FIG. 7.

When assembled, the first tandem wheel housing 72 defines a first wheelbase 254 (FIG. 3) as a length between the first wheel end axis 218 and the second wheel end axis 248 in a generally longitudinal direction of the work vehicle 10 (e.g., y-direction illustrated in FIGS. 1 and 2). The first wheelbase 254 is therefore a function of the first length 220 of the first wheel end casing 84 and the second length 250 of the second wheel end casing 86 (along with a fixed length of the central chain box 80).

Figure 7:
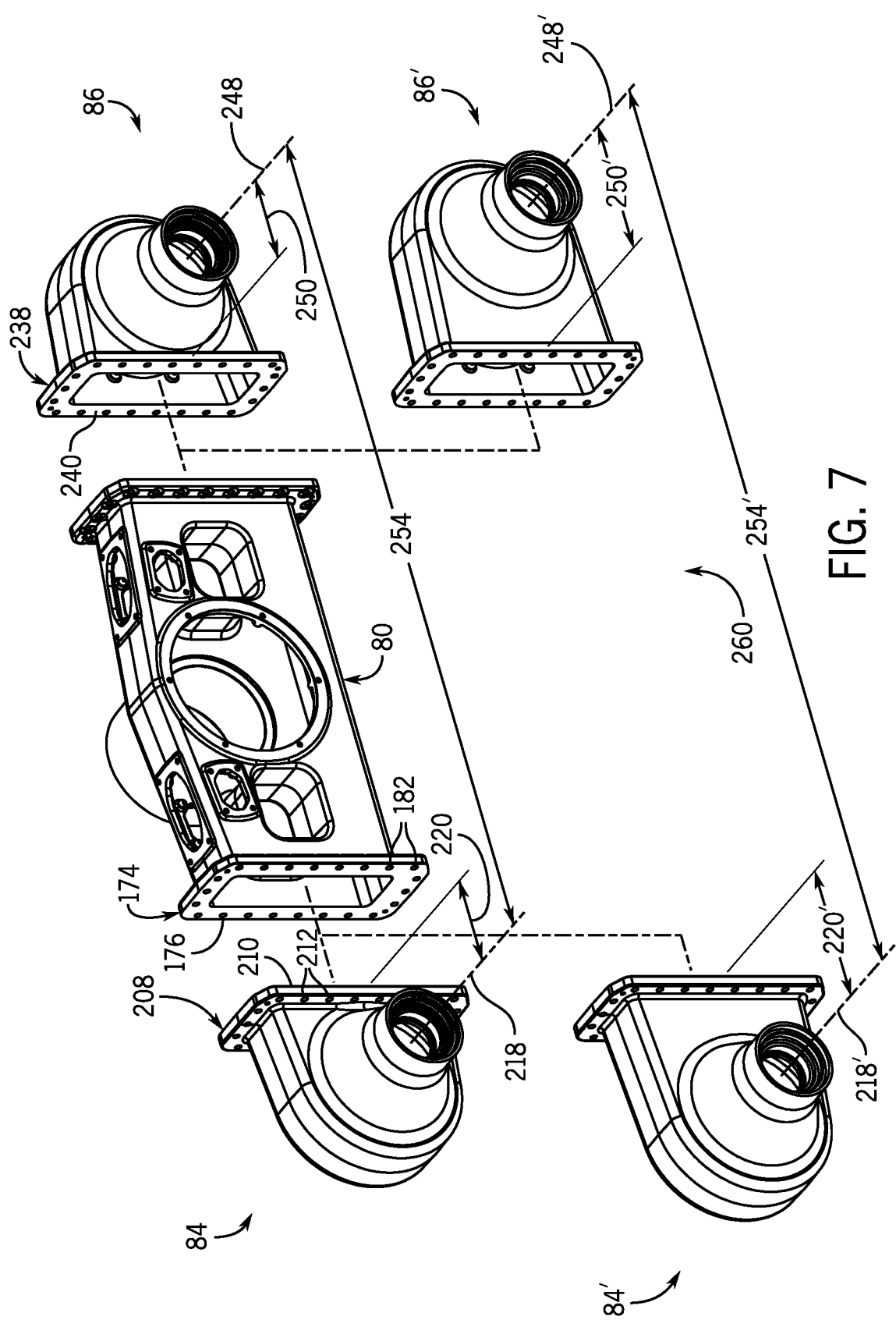
FIG. 7 is an exploded partial isometric view of a tandem wheel kit showing a central chain box and two differently sized wheel end pairs.

Reference is now also made to FIG. 7, which illustrates a tandem wheel kit 260 having alternative modular arrangements of the first wheel end casing 84 and the second wheel end casing 86. In this example, the first tandem wheel housing 72 described above may be implemented with one or more alternative wheel end casings, such as a third wheel end casing 84' and a fourth wheel end casing 86'. Unless otherwise noted, the third and fourth wheel end casings 84', 86' are similar to the first and second wheel end casings 84, 86 described above with reference to FIGS. 2-5. In particular, the third wheel end casing 84' may be mounted at the first box end 166 of the central chain box 80 to the first box flange 174. The third wheel end casing 84' has a third wheel end flange face 210' that is substantially the same size and shape as the first wheel end flange face 210, to ensure proper mounting with the first box flange 174. The third wheel end casing 84' has a third length 220' defined with a third wheel end axis 218' length 220' being different than the first length 220 (illustrated in the example of FIG. 7 as a greater length). Likewise, the fourth wheel end casing 86' for replacing the second wheel end casing 86 may be provided as substantially similar to the third wheel end 84' including a fourth length 250' that is different from the second length 250. The fourth length 250' may be substantially equal to the third length 220'. Therefore, when the third wheel end casing 84' is mounted to the central chain box 80 at the first box end 166 and the fourth wheel end casing is mounted to the central chain box 80 at the second box end 168, a second wheelbase 254' of different length (e.g., greater length) than the first wheelbase 254 is defined between the third wheel end axis 218' and the fourth wheel end axis 250'. The tandem wheel kit 260 thus selectively provides a tandem wheel housing 72 with either a first wheelbase 254 or a second wheelbase 254'.

The tandem wheel kit 260 allows for additional variations. In the illustrated examples of FIGS. 2-4, the lengths of the mounted wheel end casings (e.g., first length 220 and the second length 250) are substantially equal. It is feasible, however, for the tandem wheel kit 260 to provide wheel end casings of differing lengths mounted to the first and second box ends 166, 168. For example, the first wheel end casing 84 may be mounted while the fourth wheel end casing 86' is also mounted, with the corresponding fourth length 250' being different from the first length 220. This results in a wheelbase of a different length than the first wheelbase 254 or the second wheelbase 254' (e.g., a wheelbase length that is between the first and second wheelbases 254, 254'). Various other combinations of lengths of wheel ends are contemplated. In other examples, the tandem wheel kit 260 may be provided with additional wheel end casings of different lengths for greater modularity, for example five, six, seven, or eight wheel end casings may be provided for the tandem wheel kit 260.

It will be appreciated that the modularity of the first, second, third, and fourth wheel end casings 84, 86, 84', 86' may be provided to account for changes in the design of the work vehicle 10 (e.g., larger work vehicles or work vehicles of different classes). It is also possible to provide changes to the power train 24 (e.g., a different size engine 50 or different gearing for specific speed/torque demands) or changes in the size of the four tandem wheels 36, 38, 42, 44. As a result, some components of the tandem wheel assembly 32 may change. In the illustrated example of the first tandem wheel housing 72, these changes may include different sizes for the center sprocket 140, the first and second chains 142, 146, and/or the first and second wheel end sprockets 144, 148. Generally, larger wheels and/or a larger wheelbase may accommodate heavier machinery with greater operating loads. Accordingly, a greater tensile strength for the first and second chains 142, 146 may be required. In some examples, different sizes of the tandem wheel assembly 32 may utilize first and second chains 142, 146 as roller chains having a standardized American National Standards Institute (ANSI) industry number size of 150, 160, 170, or 180. Correspondingly, with different sizes of the first and second chains 142, 146, size substitution may be necessary for the center sprocket and/or the first and second wheel end sprockets 144,148. However, the size of the central chain box 80 will remain unchanged even in view of these substitutions.

The foregoing describes one or more example tandem wheel assemblies and tandem wheel kits in detail. Various other configurations are possible within the scope of this disclosure. For example, the disclosed dual ring two chain drive in the tandem wheel housing may be replaced with a gear train, drive shaft, a single chain, and the like. Aspects of the disclosed examples provide for a modular and robust tandem wheel of the work vehicle. The tandem wheel performs a variety of functions in mounting components of the power train, mounting two wheels, distributing loads, and accommodating terrain changes. The central chain box provides a strong, lightweight support for the tandem wheel housing.

ENUMERATED EXAMPLES

Also, the following examples are provided, which are numbered for easier reference.

1. A tandem wheel assembly for a work vehicle is provided. In various embodiments, the tandem wheel assembly comprises a central chain box having an inner wall and an outer wall defining an internal volume and extending between a first box end and a second box end, the inner wall defining as a unitary part of the central chain box a pivot portion having a box opening disposed about a pivot axis and communicating with the internal volume, the central chain box having at the first box end a first box flange with a first box flange face and having at the second box end a second box flange with a second box flange face; a first wheel end casing having a first wheel end flange with a first wheel end flange face mateable with the first box flange face, the first wheel end casing having a first wheel end opening disposed about a first wheel end axis substantially parallel to the pivot axis and in communication with the internal volume of the central chain box when the first wheel end casing is mounted to the first box end, the first wheel end casing defining a first length from the first wheel end flange face to the first wheel end axis; and a second wheel end casing having a second wheel end flange with a second wheel end flange face mateable with the second box flange face, the second wheel end casing having a second wheel end opening in communication with the internal volume of the central chain box and disposed about a second wheel end axis substantially parallel to the pivot axis and in communication with the internal volume of the central chain box when the second wheel end casing is mounted to the second box end, the second wheel end casing defining a second length from the second wheel end flange face to the second wheel end axis.

2. The tandem wheel assembly of example 1, wherein the first box flange and the first wheel end flange are mounted together by a first set of bolts extending substantially perpendicular relative to the pivot axis; and wherein the second box flange and the second wheel end flange are mounted together by a second set of bolts extending substantially perpendicular relative to the pivot axis.

3. The tandem wheel assembly of example 1, wherein the first wheel end casing further defines as a unitary part of the first wheel end casing a first wheel mount extending from an outer wall of the first wheel end casing and defining the first wheel end opening; and wherein the second wheel end casing further defines as a unitary part of the second wheel end casing a second wheel mount extending from an outer wall of the second wheel end casing and defining the second wheel end opening.

4. The tandem wheel assembly of example 1, wherein the internal volume of central chain box provides an elongated channel extending from the first box end to the second box end, the elongated channel sized to allow one or more drive chains to pass through the elongated channel.

5. The tandem wheel assembly of example 1, wherein the central chain box has one or more displacement areas for reducing the internal volume of the central chain box, the displacement areas being openings in the central chain box or dry cavities within the central chain box separate from the internal volume.

6. The tandem wheel assembly of example 1, wherein the central chain box has an upper wall and one or more grip surfaces in the upper wall, the upper wall defining as a unitary part of the central chain box the one or more grip surfaces.

7. The tandem wheel assembly of example 1, further comprising: a center sprocket mounted in the internal volume of the central chain box; a first wheel end sprocket mounted in the first wheel end casing; and a second wheel end sprocket mounted in the second wheel end casing; wherein the center sprocket, the first wheel end sprocket, and the second wheel end sprocket are aligned for mounting one or more chains for co-rotation.

8. The tandem wheel assembly of example 7, wherein the first wheel end casing has a first wheel hub and a first wheel shaft mounted in the first wheel end opening for rotation with the first wheel end sprocket; and wherein the second wheel end casing has a second wheel hub and a second wheel shaft mounted in the second wheel end opening for rotation with the second wheel end sprocket.

9. The tandem wheel assembly of example 7, wherein the center sprocket is a dual ring sprocket.

10. The tandem wheel assembly of example 1, further including a third wheel end casing having a third wheel end flange with a third wheel end flange face mateable with the first box flange face, the third wheel end casing having a third wheel end opening in communication with the internal volume of the central chain box and disposed about a third wheel end axis substantially parallel to the pivot axis and in communication with the internal volume of the central chain box when the third wheel end casing is mounted to the first box end, the third wheel end casing defining a third length from the third wheel end flange face to the third wheel end axis; wherein the third length is different than the first length.

11. The tandem wheel assembly of example 10, further including a fourth wheel end casing having a fourth wheel end flange with a fourth wheel end flange face mateable with the second box flange face, the fourth wheel end casing having a fourth wheel end opening in communication with the internal volume of the central chain box and disposed about a fourth wheel end axis substantially parallel to the pivot axis and in communication with the internal volume of the central chain box when the fourth wheel end casing is mounted to the second box end, the fourth wheel end casing defining a fourth length from the fourth wheel end flange face to the fourth wheel end axis; wherein the fourth length is different than the second length.

12. The tandem wheel assembly of example 11, wherein the first length is substantially equal to the second length; and wherein the third length is substantially equal to the fourth length.

13. The tandem wheel assembly of example 12, wherein, when the first wheel end casing is mounted to the central chain box at the first box end and the second wheel end casing is mounted to the central chain box at the second box end, a first wheelbase is defined between the first wheel end axis and the second wheel end axis; wherein, when the third wheel end casing is mounted to the central chain box at the first box end and the fourth wheel end casing is mounted to the central chain box at the second box end, a second wheelbase is defined between the third wheel end axis and the fourth wheel end axis; and wherein the first wheelbase is different from the second wheelbase.

14. In further embodiments, a tandem wheel kit for a work vehicle is provided. The tandem wheel kit includes a central chain box having an inner wall and an outer wall defining an internal volume and extending between a first box end and a second box end, the inner wall defining as a unitary part of the central chain box a pivot portion having a box opening disposed about a pivot axis and communicating with the internal volume, the central chain box having at the first box end a first box flange with a first box flange face and having at the second box end a second box flange with a second box flange face; a first wheel end casing having a first wheel end flange with a first wheel end flange face mateable with the first box flange face, the first wheel end casing defining as a unitary part of the first wheel end casing a first wheel mount extending from an outer wall of the first wheel end casing and defining a first wheel end opening disposed about a first wheel end axis substantially parallel to the pivot axis and in communication with the internal volume of the central chain box when the first wheel end casing is mounted to the first box end, the first wheel end casing defining a first length from the first wheel end flange face to the first wheel end axis; and a second wheel end casing having a second wheel end flange with a second wheel end flange face mateable with the second box flange face, the second wheel end casing defining as a unitary part of the second wheel end casing a second wheel mount extending from an outer wall of the second wheel end casing and defining a second wheel end opening in communication with the internal volume of the central chain box and disposed about a second wheel end axis substantially parallel to the pivot axis and in communication with the internal volume of the central chain box when the second wheel end casing is mounted to the second box end, the second wheel end casing defining a second length from the second wheel end flange face to the second wheel end axis; a third wheel end casing having a third wheel end flange with a third wheel end flange face mateable with the first box flange face, the third wheel end casing having a third wheel end opening in communication with the internal volume of the central chain box and disposed about a third wheel end axis substantially parallel to the pivot axis and in communication with the internal volume of the central chain box when the third wheel end casing is mounted to the first box end, the third wheel end casing defining a third length from the third wheel end flange face to the third wheel end axis, wherein the third length is different than the first length; wherein a configurable tandem wheelbase is defined by selectively mounting to the first box end of the central chain box either the first wheel end casing or the third wheel end casing.

15. The tandem wheel kit of example 14, further including a fourth wheel end casing having a fourth wheel end flange with a fourth wheel end flange face mateable with the second box flange face, the fourth wheel end casing having a fourth wheel end opening in communication with the internal volume of the central chain box and disposed about a fourth wheel end axis substantially parallel to the pivot axis and in communication with the internal volume of the central chain box when the fourth wheel end casing is mounted to the second box end, the fourth wheel end casing defining a fourth length from the fourth wheel end flange face to the fourth wheel end axis; wherein the fourth length is different than the second length.

The examples discussed above result in a variety of benefits of the disclosed tandem wheel. For example, the mateable box flanges and wheel end flanges provide modularity in wheel ends of varying lengths. As such the same central chain box and some internal components may be utilized in different work vehicle models with different tandem wheelbases, reducing manufacturing costs. With the pivot portion formed unitary with the central chain box instead of as a bolted part separate part, torque loads from the power train are transferred at the central chain box instead of at failure-prone bolts. The unitary central chain box design also reduces weight compared to conventional assemblies, which improves work efficiency and performance. The pivotable tandem wheel improves the motor grader's driving traction, weight distribution, and blade cut consistency, resulting in improved performance of construction tasks. The tandem wheel of the work vehicle is suitably robust and strong to support and distribute significant static and dynamic loads.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. Explicitly referenced embodiments herein were chosen and described in order to best explain the principles of the disclosure and their practical application, and to enable others of ordinary skill in the art to understand the disclosure and recognize many alternatives, modifications, and variations on the described example(s). Accordingly, various embodiments and implementations other than those explicitly described are within the scope of the following claims.

What is claimed is:

1. A tandem wheel assembly for a work vehicle comprising:
a central chain box having an inner wall and an outer wall defining an internal volume and extending between a first box end and a second box end, the inner wall defining as a unitary part of the central chain box aan annular inwardly extending pivot portion having a box opening disposed about a pivot axis and communicating with the internal volume, the pivot portion configured to couple the central chain box to the work vehicle so as to pivot about the pivot axis, the central chain box having at the first box end a first box flange with a first box flange face about a first opening that is at an angle to the pivot axis and having at the second box end a second box flange with a second box flange face about a second opening that is at an angle to the pivot axis;
a first wheel end casing having a first wheel end flange with a first wheel end flange face mateable with the first box flange face, the first wheel end casing having a first wheel end opening disposed about a first wheel end axis substantially parallel to the pivot axis and in communication with the internal volume of the central chain box when the first wheel end casing is mounted to the first box end, the first wheel end casing defining a first length from the first wheel end flange face to the first wheel end axis; and
a second wheel end casing having a second wheel end flange with a second wheel end flange face mateable with the second box flange face, the second wheel end casing having a second wheel end opening in communication with the internal volume of the central chain box and disposed about a second wheel end axis substantially parallel to the pivot axis and in communication with the internal volume of the central chain box when the second wheel end casing is mounted to the second box end, the second wheel end casing defining a second length from the second wheel end flange face to the second wheel end axis.

2. The tandem wheel assembly of claim 1, wherein the first box flange and the first wheel end flange are mounted together by a first set of bolts extending substantially perpendicular relative to the pivot axis; and
wherein the second box flange and the second wheel end flange are mounted together by a second set of bolts extending substantially perpendicular relative to the pivot axis.

3. The tandem wheel assembly of claim 1, wherein the first wheel end casing further defines as a unitary part of the first wheel end casing a first wheel mount extending from an outer wall of the first wheel end casing and defining the first wheel end opening; and
wherein the second wheel end casing further defines as a unitary part of the second wheel end casing a second wheel mount extending from an outer wall of the second wheel end casing and defining the second wheel end opening.

4. The tandem wheel assembly of claim 1, wherein the internal volume of central chain box provides an elongated channel extending from the first box end to the second box end, the elongated channel sized to allow one or more drive chains to pass through the elongated channel.

5. The tandem wheel assembly of claim 1, wherein the central chain box has one or more displacement areas for reducing the internal volume of the central chain box, the displacement areas being openings in the central chain box or dry cavities within the central chain box separate from the internal volume.

6. The tandem wheel assembly of claim 1, wherein the central chain box has an upper wall and one or more grip surfaces in the upper wall, the upper wall defining as a unitary part of the central chain box the one or more grip surfaces.

7. The tandem wheel assembly of claim 1, further comprising:
a center sprocket mounted in the internal volume of the central chain box;
a first wheel end sprocket mounted in the first wheel end casing; and
a second wheel end sprocket mounted in the second wheel end casing;
wherein the center sprocket, the first wheel end sprocket, and the second wheel end sprocket are aligned for mounting one or more chains for co-rotation.

8. The tandem wheel assembly of claim 7, wherein the first wheel end casing has a first wheel hub and a first wheel shaft mounted in the first wheel end opening for rotation with the first wheel end sprocket; and
wherein the second wheel end casing has a second wheel hub and a second wheel shaft mounted in the second wheel end opening for rotation with the second wheel end sprocket.

9. The tandem wheel assembly of claim 7, wherein the center sprocket is a dual ring sprocket.

10. The tandem wheel assembly of claim 1, further including a third wheel end casing having a third wheel end flange with a third wheel end flange face mateable with the first box flange face, the third wheel end casing having a third wheel end opening in communication with the internal volume of the central chain box and disposed about a third wheel end axis substantially parallel to the pivot axis and in communication with the internal volume of the central chain box when the third wheel end casing is mounted to the first box end, the third wheel end casing defining a third length from the third wheel end flange face to the third wheel end axis;
wherein the third length is different than the first length.

11. The tandem wheel assembly of claim 10, further including a fourth wheel end casing having a fourth wheel end flange with a fourth wheel end flange face mateable with the second box flange face, the fourth wheel end casing having a fourth wheel end opening in communication with the internal volume of the central chain box and disposed about a fourth wheel end axis substantially parallel to the pivot axis and in communication with the internal volume of the central chain box when the fourth wheel end casing is mounted to the second box end, the fourth wheel end casing defining a fourth length from the fourth wheel end flange face to the fourth wheel end axis;
wherein the fourth length is different than the second length.

12. The tandem wheel assembly of claim 11, wherein the first length is substantially equal to the second length; and
wherein the third length is substantially equal to the fourth length.

13. The tandem wheel assembly of claim 12, wherein, when the first wheel end casing is mounted to the central chain box at the first box end and the second wheel end casing is mounted to the central chain box at the second box end, a first wheelbase is defined between the first wheel end axis and the second wheel end axis;

wherein, when the third wheel end casing is mounted to the central chain box at the first box end and the fourth wheel end casing is mounted to the central chain box at the second box end, a second wheelbase is defined between the third wheel end axis and the fourth wheel end axis; and wherein the first wheelbase is different from the second wheelbase.

14. A tandem wheel kit for a work vehicle comprising:

a central chain box having an inner wall and an outer wall defining an internal volume and extending between a first box end and a second box end, the inner wall defining as a unitary part of the central chain box an annular inwardly extending pivot portion having a box opening disposed about a pivot axis and communicating with the internal volume, the pivot portion configured to couple the central chain box to the work vehicle so as to pivot about the pivot axis, the central chain box having at the first box end a first box flange with a first box flange face about a first opening that is at an angle to the pivot axis and having at the second box end a second box flange with a second box flange face about a second opening that is at an angle to the pivot axis;

a first wheel end casing having a first wheel end flange with a first wheel end flange face mateable with the first box flange face, the first wheel end casing defining as a unitary part of the first wheel end casing a first wheel mount extending from an outer wall of the first wheel end casing and defining a first wheel end opening disposed about a first wheel end axis substantially parallel to the pivot axis and in communication with the internal volume of the central chain box when the first wheel end casing is mounted to the first box end, the first wheel end casing defining a first length from the first wheel end flange face to the first wheel end axis; and a second wheel end casing having a second wheel end flange with a second wheel end flange face mateable with the second box flange face, the second wheel end casing defining as a unitary part of the second wheel end casing a second wheel mount extending from an outer wall of the second wheel end casing and defining a second wheel end opening in communication with the internal volume of the central chain box and disposed about a second wheel end axis substantially parallel to the pivot axis and in communication with the internal volume of the central chain box when the second wheel end casing is mounted to the second box end, the second wheel end casing defining a second length from the second wheel end flange face to the second wheel end axis;

a third wheel end casing having a third wheel end flange with a third wheel end flange face mateable with the first box flange face, the third wheel end casing having a third wheel end opening in communication with the internal volume of the central chain box and disposed about a third wheel end axis substantially parallel to the pivot axis and in communication with the internal volume of the central chain box when the third wheel end casing is mounted to the first box end, the third wheel end casing defining a third length from the third wheel end flange face to the third wheel end axis, wherein the third length is different than the first length;

wherein a configurable tandem wheelbase is defined by selectively mounting to the first box end of the central chain box either the first wheel end casing or the third wheel end casing.

15. The tandem wheel kit of claim 14, wherein the first box flange and the first wheel end flange are mounted together by a first set of bolts extending substantially perpendicular relative to the pivot axis; and wherein the second box flange and the second wheel end flange are mounted together by a second set of bolts extending substantially perpendicular relative to the pivot axis.

16. The tandem wheel kit of claim 14, wherein the internal volume of central chain box has an elongated channel extending from the first box end to the second box end, the elongated channel sized to allow one or more drive chains to pass through the elongated channel; and wherein the central chain box has one or more displacement areas for reducing the internal volume of the central chain box, the displacement areas being openings in the central chain box or dry cavities within the central chain box separate from the internal volume.

17. The tandem wheel kit of claim 14, further comprising:

a center sprocket mounted in the internal volume of the central chain box;

a first wheel end sprocket mounted in the first wheel end casing; and a second wheel end sprocket mounted in the second wheel end casing;

wherein the center sprocket, the first wheel end sprocket, and the second wheel end sprocket are aligned for mounting one or more chains for co-rotation;

wherein the first wheel end casing has a first wheel hub and a first wheel shaft mounted in the first wheel end opening for rotation with the first wheel end sprocket; and wherein the second wheel end casing has a second wheel hub and a second wheel shaft mounted in the second wheel end opening for rotation with the second wheel end sprocket.

18. The tandem wheel kit of claim 14, further including a fourth wheel end casing having a fourth wheel end flange with a fourth wheel end flange face mateable with the second box flange face, the fourth wheel end casing having a fourth wheel end opening in communication with the internal volume of the central chain box and disposed about a fourth wheel end axis substantially parallel to the pivot axis and in communication with the internal volume of the central chain box when the fourth wheel end casing is mounted to the second box end, the fourth wheel end casing defining a fourth length from the fourth wheel end flange face to the fourth wheel end axis;

wherein the fourth length is different than the second length.

19. The tandem wheel kit of claim 18, wherein the first length is substantially equal to the second length; and wherein the third length is substantially equal to the fourth length.

20. The tandem wheel kit of claim 19, wherein, when the first wheel end casing is mounted to the central chain box at the first box end and the second wheel end casing is mounted to the central chain box at the second box end, a first wheelbase is defined between the first wheel end axis and the second wheel end axis;

wherein, when the third wheel end casing is mounted to the central chain box at the first box end and the fourth wheel end casing is mounted to the central chain box at the second box end, a second wheelbase is defined between the third wheel end axis and the fourth wheel end axis; and wherein the first wheelbase is different from the second wheelbase.

* * * * *

UNITED STATES PATENT AND TRADEMARK OFFICE
CERTIFICATE OF CORRECTION

PATENT NO. : 11,938,812 B2
APPLICATION NO. : 16/852117
DATED : March 26, 2024
INVENTOR(S) : Fliearman et al.

It is certified that error appears in the above-identified patent and that said Letters Patent is hereby corrected as shown below:

In the Claims

In Column 17, Line 14, Claim 1, delete "aan" and insert -- an --, therefor.

Signed and Sealed this
Thirteenth Day of August, 2024

Katherine Kelly Vidal
*Director of the United States Patent and Trademark Office*